(12) United States Patent
Darcy et al.

(10) Patent No.: US 7,353,212 B1
(45) Date of Patent: Apr. 1, 2008

(54) METHOD AND STRUCTURE FOR ASSIGNING A TRANSACTION COST

(75) Inventors: Paul B. Darcy, Redmond, WA (US); Steve A. DeLuca, Woodinville, WA (US); Simon Towers, San Jose, CA (US); Simon Tovatt, Stockholm (SE)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/576,686

(22) Filed: May 23, 2000

(51) Int. Cl.
*G06Q 10/00* (2006.01)
*G06Q 30/00* (2006.01)
*G06F 17/00* (2006.01)
*G06G 7/00* (2006.01)

(52) U.S. Cl. .......................... 705/400; 705/1
(58) Field of Classification Search ................. 705/26, 705/14, 27, 40, 41, 42, 39, 400, 35, 53; 709/203, 709/227; 235/375; 379/111, 112.07, 114.01
See application file for complete search history.

(56) References Cited

U.S. PATENT DOCUMENTS

| | | | | |
|---|---|---|---|---|
| 5,625,690 | A * | 4/1997 | Michel et al. ................. | 705/53 |
| 5,745,880 | A * | 4/1998 | Strothmann ..................... | 705/7 |
| 5,822,750 | A * | 10/1998 | Jou et al. ........................ | 707/2 |
| 6,086,618 | A * | 7/2000 | Al-Hilali et al. ............. | 709/226 |
| 6,219,654 | B1 * | 4/2001 | Ruffin ......................... | 705/400 |
| 6,247,047 | B1 * | 6/2001 | Wolff .......................... | 705/26 |
| 6,330,552 | B1 * | 12/2001 | Farrar et al. ................. | 705/400 |
| 6,338,046 | B1 * | 1/2002 | Saari et al. ................... | 705/34 |
| 6,397,207 | B1 * | 5/2002 | Bleizeffer et al. .............. | 707/2 |
| 7,020,621 | B1 * | 3/2006 | Feria et al. ................... | 705/10 |
| 2005/0060584 | A1 * | 3/2005 | Ginter et al. ............... | 713/201 |

OTHER PUBLICATIONS

Liebmann, L., "The meter is running", Sep. 23, 1996, Communications Week, pp. 50-55.*
Aly E. El-Abd, "Modeling Resources Allocation and Performance Measures in Distributed Computer Networks", Jul. 1995, pp. 581-586, IEEE Procedding of the Singapore International Conference on Networks.*
Best Practices in Networking, Dec. 1994, Capacity Management Review, V22n12, pp. 1-5+.*

* cited by examiner

*Primary Examiner*—John W. Hayes
*Assistant Examiner*—Fadey S Jabr
(74) *Attorney, Agent, or Firm*—Shook, Hardy & Bacon L.L.P.

(57) ABSTRACT

A method and structure for calculating transaction costs as a function of one or more services provided by a computer system. Each user/computer transaction utilizes one or more computer system services to execute the transaction. Each computer system service provided by an IT department incurs a cost in terms of the equipment, software, personnel and facilities utilized to provide distinct levels of availability and response time. By identifying one or more IT services utilized to execute a transaction and by calculating the actual cost incurred to provide one or more of the services, a transaction cost is calculated by summing up the service costs. Thus, the transaction cost is a function of the service costs of the one or more services utilized to execute the transaction.

18 Claims, 6 Drawing Sheets

METHOD AND STRUCTURE FOR ASSIGNING A TRANSACTION COST

FIELD OF THE INVENTION

In general, the present invention relates to computer software, and in particular, to a method and structure for calculating a computer transaction cost as a function of computer system costs incurred to execute the transaction.

BACKGROUND OF THE INVENTION

Conventionally, many of the computer system services offered by a service provider, or utilized by various computers within the computer system, are not defined in terms of a cost per user/computer transaction. Instead, each individual service provided by a service provider, such as an information technology (IT) department, is conventionally associated as part of a lump sum required in providing all IT services, often with no correlation to the actual cost incurred to provide the individual service. For example, an IT department typically requires funding in terms of equipment, such as computer hardware, software, personnel to maintain the equipment and/or the software and facilities to accommodate the equipment and the personnel.

In general, a computer transaction such as searching a remote database would require different IT services to execute the transaction (in terms of computer hardware, software, personnel and facilities) than a computer transaction sending e-mail. The cost of the transaction, in terms of the costs incurred by the IT department to provide the services, would also be different. Under a conventional approach, however, the individual cost of the IT service as a function of the actual cost to provide that individual cost is not readily available. Instead, the costs associated with providing the various services are not considered individually, but are rather conventionally grouped as part of the general IT budget. Accordingly, under this traditional approach, a user transaction cost is typically approximated in a very general way as a percentage of the overall IT budget.

As mentioned above, two computer transactions often require different IT services to be executed. Under the conventional cost approximation of the total IT budget, however, a transaction cost would include the cost of providing and maintaining IT services not utilized to execute the transaction. This conventional transaction cost approximation is not a function of the actual IT cost incurred to execute the transaction. Accordingly, many IT budgets are viewed as an overhead cost which cannot be accurately reflected and correlated to actual use. Thus, there is a need for attributing IT costs associated with use of various IT resources to the users that are utilizing the services to calculate a user transaction cost.

Many software applications are conventionally sold on computer-readable mediums, such as a CD-ROM or via the Internet, along with a user product license in which the user or users load the software on their system. Accordingly, as the software is updated, the user often has to purchase the update and load it on the system. As would be generally understood, this type of transaction is product based, with the user paying for receipt of the software product.

With the increase in global network transactions, however, traditional software applications are transforming into a service that is provided by the network provider. For example, a user pays a fee to have access to the global network, which in turn also gives the user access to a plurality of software applications. In this scenario, the user is not required to load any software on their system and software updates are automatically applied the next time the user accesses the application. Thus, this type of transaction becomes service based, with the user paying for access to the service.

Under a conventional transaction cost analysis, the user fee would not accurately reflect the actual cost associated with providing the user access to the system and software applications, but would more generally reflect an assigned value by the service provider. Under this approach, the user would likely be limited to a flat fee billing arrangement, and would not be given the ability to determine his or her actual cost of use. Moreover, the service provider would have a limited amount of information in determining the cost (in terms of equipment, software, facilities, and personnel) for different types of computer user use. Accordingly, there is also a need to more accurately associate user transaction costs for service-based software delivery.

SUMMARY OF THE INVENTION

The present invention satisfies the above-described need by providing a method and structure for assigning a transaction cost to a user/computer transaction as a function of the actual cost of the IT services utilized to execute the transaction.

Generally described, the present invention provides a method in a computer system for assigning a cost to a computer transaction. In accordance with the method, one or more underlying services utilized to execute the computer transaction are identified. Additionally, a cost associated with the one or more services utilized to execute the transaction, as a function of the usage of the service is determined.

In another aspect of the present invention, a computer-readable medium having a service cost component is provided. In accordance with the present invention, the service cost component includes data indicative of a determination of a computer transaction cost as a function of one or more services utilized to execute the computer transaction.

In a further aspect of the present invention, a method in a computer system of executing a computer transaction is provided. In accordance with the method, a user process requests the execution of a transaction. One or more service processes receive and process the request. Additionally, the one or more service processes determine a cost associated with the execution of the transaction as a function of the services utilized to execute the transaction.

In yet another aspect of the present invention, a method in a computer system for measuring the quality associated with the execution of a computer transaction is provided. In accordance with the method, an identifier is associated with the transaction. One or more services utilized to execute the transaction are identified. A service record is then monitored to associate availability and a response time of the one or more services utilized to execute the transaction.

The system and methods of the present invention result in numerous advantages for both the user and the provider. By calculating a transaction cost as a function of the IT service cost, a computer system IT department is able to correlate its costs with services provided with a high degree of granularity. This also allows the user monitor his or her use and associate different transaction with an actual cost of use. By equating a transaction with an actual cost, the IT department can pass along its cost to the user, which may be further passed along. Additionally, the ability to track actual cost further facilitates the ability to make software applications a service based commodity.

BRIEF DESCRIPTION OF THE DRAWING

The present invention is described in detail below with reference to the attached figures, wherein.

DETAILED DESCRIPTION OF THE INVENTION

Figure 9:
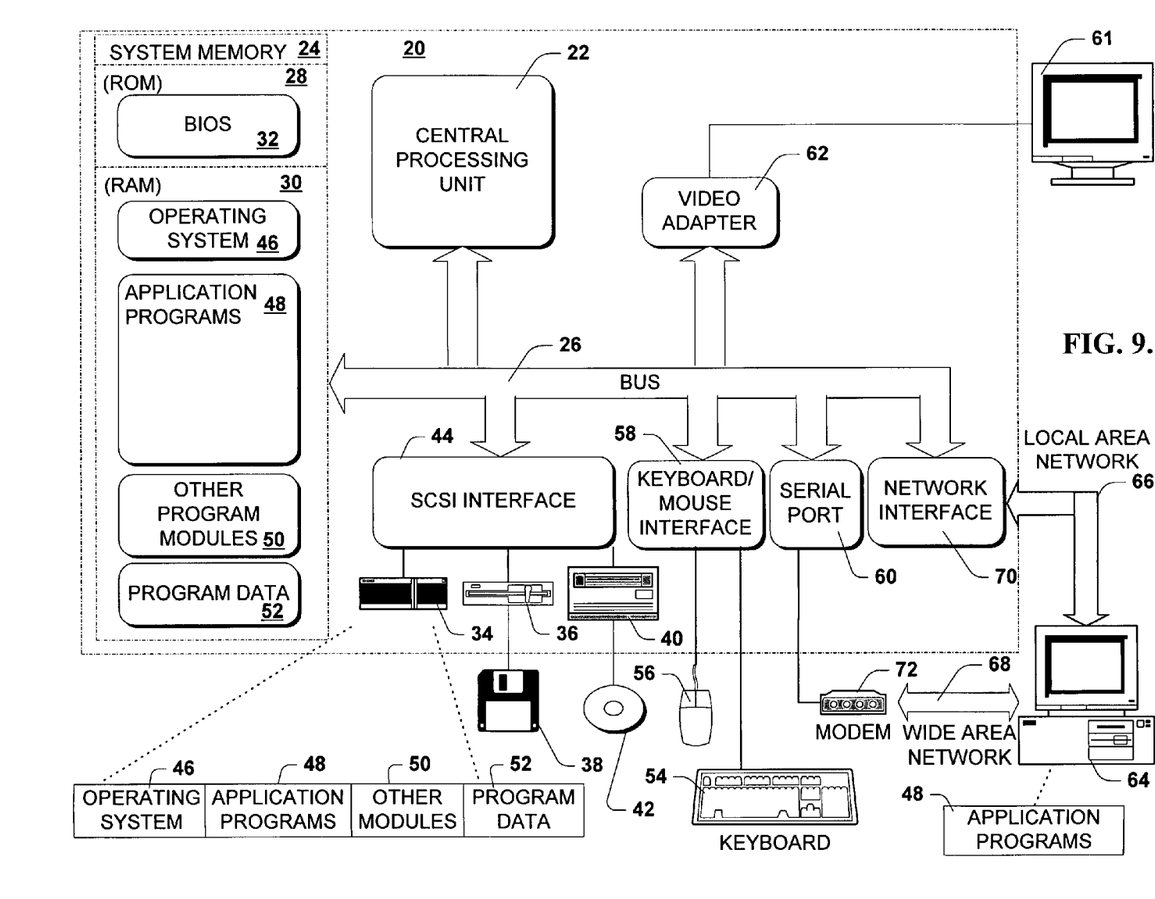
FIG. 9 is a block diagram of a computing system environment suitable for use in implementing the present invention.

The present invention provides a method and system for associating a transaction cost as a function of IT service costs. FIG. 9 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency or requirement relating to any one or combination of components illustrated in the exemplary operating environment.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing the invention includes a general-purpose computing device in the form of a computer 20. Components of computer 20 include, but are not limited to, a processing unit 22, a system memory 24, and a system bus 26 that couples various system components including the system memory to the processing unit 22. The system bus 26 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 20 typically includes a variety of computer readable media. Computer readable media can be any available media that can be accessed by computer 20 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 24 includes computer storage media in the form of volatile and/or nonvolatile memory such as read only memory (ROM) 28 and random access memory (RAM) 30. A basic input/output system 32 (BIOS), containing the basic routines that help to transfer information between elements within computer 20, such as during start-up, is typically stored in ROM 28. RAM 30 typically contains data and/or program modules that are immediately accessible to and/or presently being operated on by processing unit 22. By way of example, and not limitation, FIG. 9 illustrates operating system 46, application programs 48, other program modules 50, and program data 52.

The computer 20 may also include other removable/non-removable, volatile/nonvolatile computer storage media. By way of example only, FIG. 9 illustrates a hard disk drive 34 that reads from or writes to non-removable, nonvolatile magnetic media, a magnetic disk drive 36 that reads from or writes to removable, nonvolatile magnetic disk 38, and an optical disk drive 40 that reads from or writes to a removable, nonvolatile optical disk 42 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 34, magnetic disk drive 36, and optical disk drive 40 are typically connected to the system bus 26 by a Small Computer System Interface (SCSI) 44. Alternatively, the hard disk drive 34, magnetic disk drive 36 and optical disk drive 40 may be connected to the system bus 26 by a hard disk drive interface, a magnetic disk drive interface, and an optical drive interface, respectively.

The drives and their associated computer storage media discussed above and illustrated in FIG. 9, provide storage of computer readable instructions, data structures, program modules and other data for the computer 20. In FIG. 9, for example, hard disk drive 34 is illustrated as storing operating system 46, application programs 48, other program modules 50, and program data 52. Note that these components can either be the same as or different from operating system 46, application programs 48, other program modules 50, and program data 52. A user may enter commands and information into the computer 20 through input devices such as a keyboard 54 and pointing device 56, commonly referred to as a mouse, trackball or touch pad. Other input devices (not shown) may include a microphone, joystick, game pad, satellite dish, scanner, or the like. These and other input devices are often connected to the processing unit 22 through a user input interface 58 or a serial port interface 60 that is coupled to the system bus, but may be connected by other interface and bus structures, such as a parallel port, game port or a universal serial bus (USB). A monitor 61 or other type of display device is also connected to the system bus 26 via an interface, such as a video adapter 62. In addition to the monitor 61, computers may also include other peripheral output devices such as speakers and printers, which may be connected through an output peripheral interface.

The computer 20 may operate in a networked environment using logical connections to one or more remote computers, such as a remote computer 64. The remote computer 64 may be a personal computer, a server, a router, a network PC, a peer device or other common network node, and typically includes many or all of the elements described above relative to the computer 20, although only a memory storage device has been illustrated in FIG. 9. The logical connections depicted in FIG. 9 include a local area network (LAN) 66 and a wide area network (WAN) 68, but may also include other networks. Such networking environments are commonplace in offices, enterprise-wide computer networks, Intranets and the Internet.

When used in a LAN networking environment, the computer 20 is connected to the LAN 66 through a network interface or adapter 70. When used in a WAN networking environment, the computer 20 typically includes a modem 72 or other means for establishing communications over the WAN 68, such as the Internet. The modem 72, which may be internal or external, may be connected to the system bus 26 via the serial port interface 60 or other appropriate mechanism. In a networked environment, program modules depicted relative to the computer 20, or portions thereof, may be stored in the remote memory storage device. By way of example, and not limitation, FIG. 9 illustrates remote application programs 48 as residing on memory device 64. It will be appreciated that the network connections shown are exemplary and other means of establishing a communications link between the computers may be used.

Although many other internal components of the computer 20 are not shown, those of ordinary skill in the art will appreciate that such components and the interconnection are well known. Accordingly, additional details concerning the internal construction of the computer 20 need not be disclosed in connection with the present invention.

Those skilled in the art will understand that program modules such as the operating system 46, application programs 48 and data 52 are provided to the computer 20 via one of its memory storage devices, which may include ROM 28, RAM 30, hard disk drive 34, magnetic disk drive 36 or optical disk drive 40. Preferably, the hard disk drive 34 is used to store data 52 and programs, including the operating system 46 and application programs 48.

When the computer 20 is turned on or reset, the BIOS 32, which is stored in the ROM 28 instructs the processing unit 22 to load the operating system from the hard disk drive 34 into the RAM 30. Once the operating system 46 is loaded in RAM 30, the processing unit 22 executes the operating system code and causes the visual elements associated with the user interface of the operating system 46 to be displayed on the monitor 61. When an application program 48 is opened by a user, the program code and relevant data are read from the hard disk drive 34 and stored in RAM 30.

Figure 10:
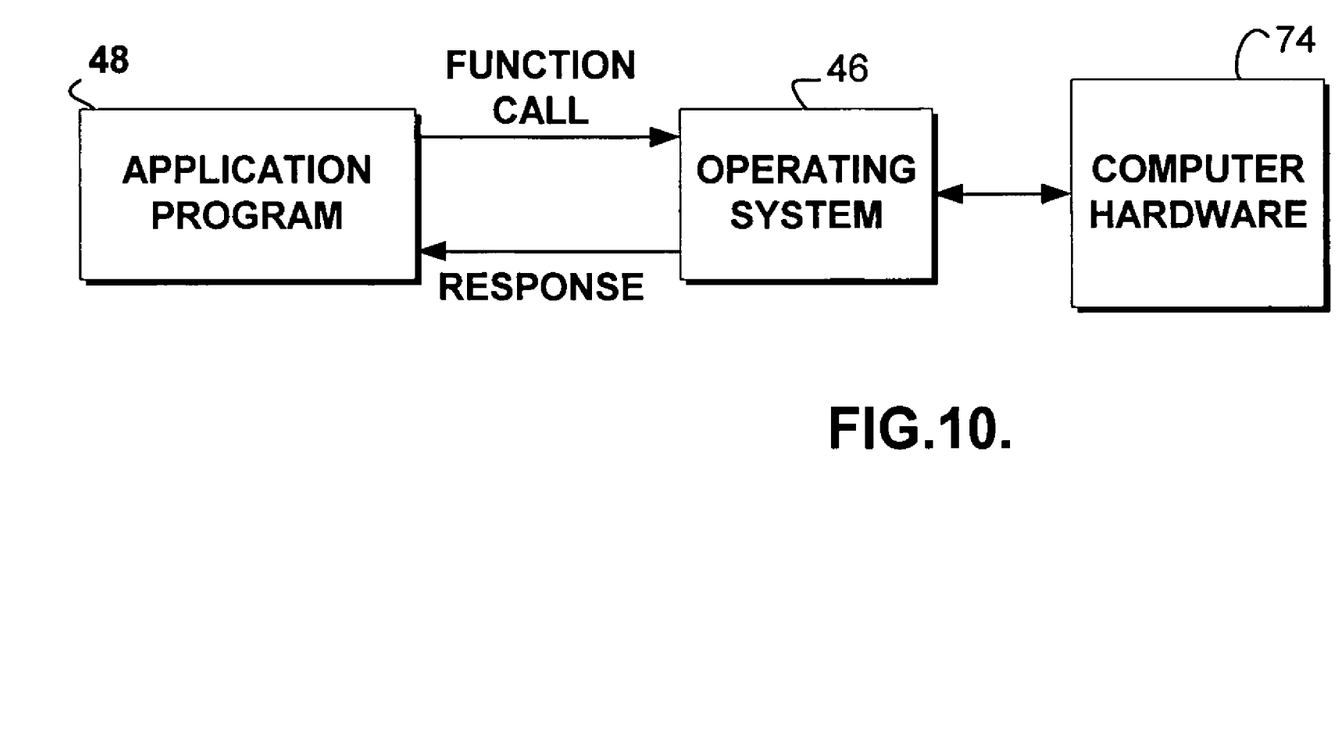
FIG. 10 is a block diagram illustrating the interface between various computer input/output devices, an operating system, and an application program.

FIG. 10 illustrates the interaction between the computer hardware 74, the operating system 46 and an application program 48. Referring now to FIGS. 9 and 10, the operating system 46 is loaded into RAM 30 when the computer 20 is turned on or reset. The operating system 46 provides the basic interface between the computer's resources, the user and the application program 48. The operating system 46 interprets and carries out instructions issued by the user. For example, when the user wants to load an application program 48, the operating system 46 interprets the instruction and causes the processing unit 22 to load the program from the hard disk drive 34 into the RAM 30. Once the application program 48 is loaded into RAM 30, the processing unit 22 executes it. In the case of large programs, the processing unit 22 loads various portions of the program 48 into RAM 30 as needed.

The operating system 46 also provides a variety of functions or services that allow application program 48 to deal with various types of input/output (I/O). This allows an application program 48 to issue simple function calls that cause the operating system 46 to perform the steps required to accomplish the tasks, such as displaying text on the monitor 61.

With continued reference to FIG. 10, the application program 48 communicates with the operating system 46 by calling predefined function calls provided by the operating system 46. The operating system 46 responds by providing the requested information or executing the requested task.

Figure 1:
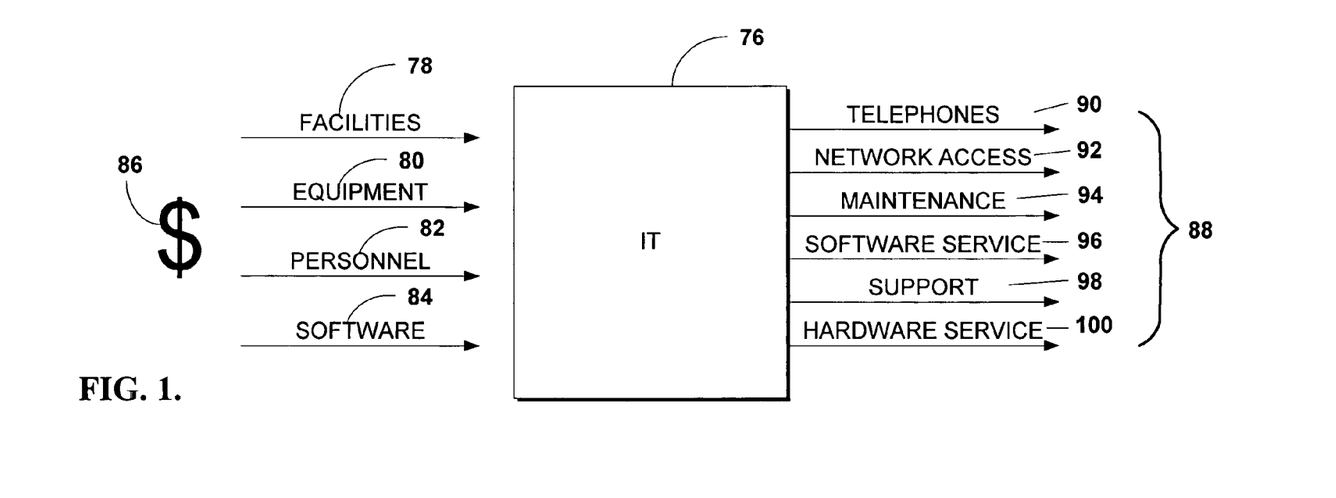
FIG. 1 is a block diagram illustrative of information technology (IT) costs for one or more computer networks.

The present invention relates to a method and system for determining the cost associated with accessing and using various computer system components based on the costs incurred to provide the components. FIG. 1 is a block diagram illustrative of a conventional method of defining and monitoring information technology (IT) costs for one or more computer networks. In general, an IT department 76 requires a variety of inputs to operate. These inputs generally include facilities 78, equipment 80, personnel 82, and software 84. Generally, these individual inputs are collectively considered as part of an overall cost 86 required to provide an IT department and are the basis for determining an IT department budget.

Corresponding to the overall IT cost 86, the IT department 76 in turn provides one or more users a variety of services 88. A service can be generally considered as something that gives a quantifiable benefit to an individual user/computer. For example, the services 88 provided by an IT department can include telephone access 90, computer network access 92, maintenance 94, software service 96, support 98, and hardware service 100. As would be generally understood by someone skilled in the relevant art, the services provided by an IT department would include a variety of additional or different services dependant on the needs and resources of the users.

Typically, the IT services utilized by a user may vary between different users and/or may vary within a single user. For example, a first user may utilize telephone access 90 and network access 92 on a daily basis. In contrast, a second user may only use the telephone access 90 and never use the network access 92. Similarly, a user may require support 98 every day for an entire week, and never require that service again for the remainder of the year. Accordingly, conventional attempts to determine a user/computer transaction cost as a function of the IT services 88 utilized to execute the transaction have been rudimentary because of the inability to properly identify the IT services associated with a user/computer transaction and determine the costs of the services based on the overall IT costs 86.

Figure 2:
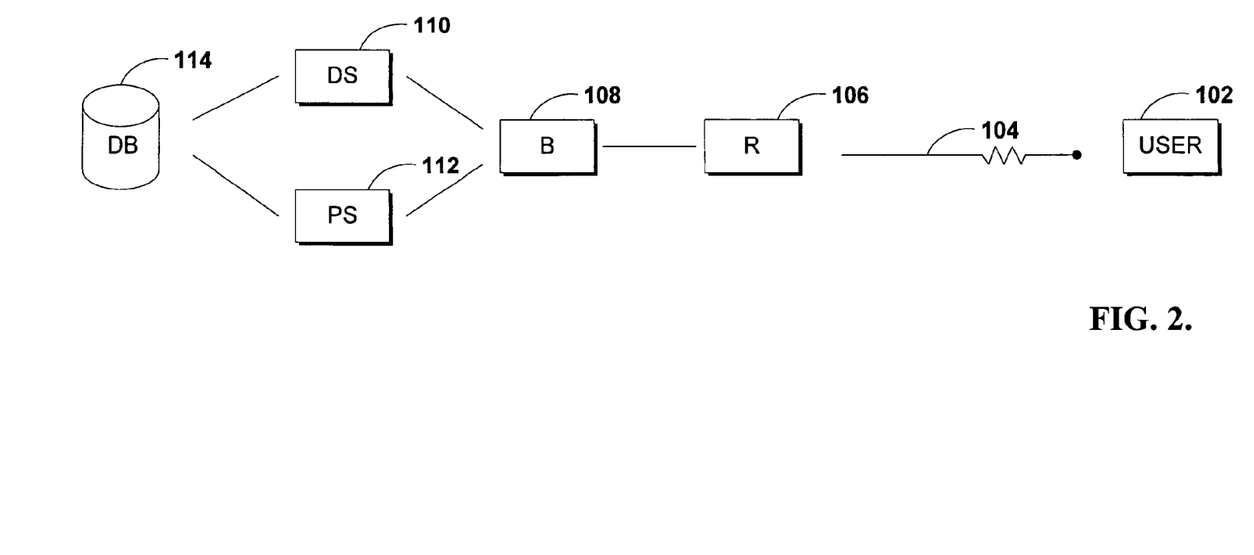
FIG. 2 is a block diagram illustrative of various components of a computer network utilized for a computer/user transaction.

FIG. 2 is a block diagram illustrative of various components of computer network utilized for a single computer/user transaction. In such a system, a user/computer 102 initiates a transaction request requiring the resources of the computer network. For example a user may request to view, search and/or add data to a database that is maintained centrally. Accordingly, the first IT cost associated with the user/computer transaction would be the installation and maintenance of the computer 102. As would be readily understood, the transaction request may be a function of a user input to a computer, or as non-user initiated request by a computer.

To execute the transaction request on the network, the computer 102 must be in communication with the computer network. Accordingly, the computer 102 must be connected to the network 104 via any variety of connectivity means, such as modems, LANs, and WANs. Once received by the computer network, the computer transaction request may pass through a router 106, a bridge 108, either a domain server 110 or a proxy server 112 until finally reaching the database 114.

In this example, the user/computer's transaction request touches upon at least six different computer network resources to execute the transaction. Each of these resources requires a number of IT services to provide the resource. The required services can include equipment, software, facilities, support and maintenance. As would be readily understood, alternative or more expansive network configurations are considered within the scope of the present invention.

Figure 3:
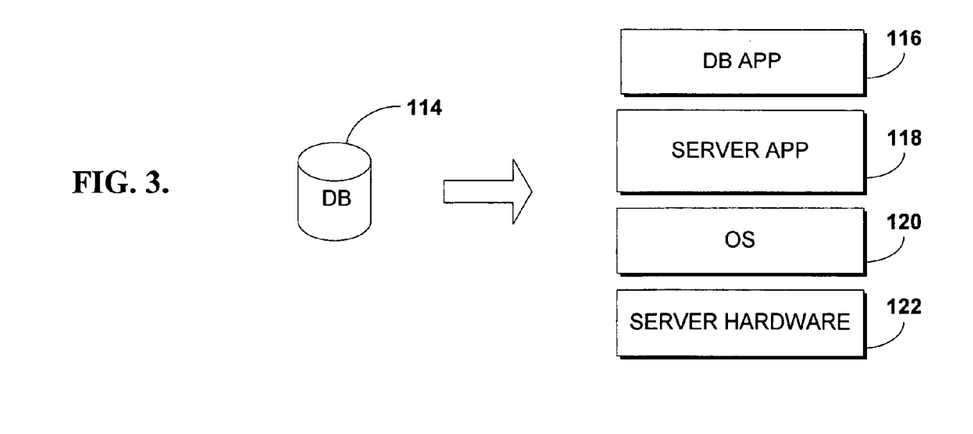
FIG. 3 is a block diagram illustrative of some of the underlying components associated with maintaining and providing a single component within the computer network of FIG. 2.

For example, FIG. 3 is a block diagram illustrative of some of the underlying components associated with maintaining and providing the database 114 component of the computer network (FIG. 2). In terms of solely software and hardware, the database application software 116 may include and correspond to functionality provided by a server application software 118, such Microsoft Corporation's SQL Server® server application software. Moreover, an operating system 120 executes and manages both software applications 116, 118. Finally, computer system hardware 122 executes the various operating system 120 and software application 116, 118 instructions.

Each of the underlying components, 116-120, provided by the computer system IT department have a fixed, or static, cost of providing the service identified with them. For example, the database application program 116 incurs the IT cost of the software license from the manufacturer. Additionally, the server hardware 122 incurs the IT cost of providing and supporting the computer hardware. Moreover, there is an overhead IT cost of the facility (in terms of rent, air conditioning, etc.) utilized to house the server hardware 122. Generally, because these costs do not change once incurred, they can be distributed on a per user/computer basis in a variety of manners.

In addition to the fixed costs associated with providing the underlying components, 116-120, a variable cost, in terms of the IT department personnel utilized to support components, can be associated to the cost of providing the service. Often, different IT technicians may be required to service and/or maintain the different components. Additionally, a single IT technician may be required to work on more than one project. While the IT staff people may not be utilized the entire time, their availability to support the computer system components can be considered as part of the cost incurred by the system. Accordingly, the cost associated with the IT personnel costs may depend on the amount of time IT technicians are assigned and/or work on various IT components.

With reference again to FIG. 2, as a user/computer transaction is executed, a number of the IT services are utilized (or at least are available) to allow the transaction to be executed. Accordingly, by monitoring which services have been used and by calculating the IT cost of providing the service, a user transaction cost can be calculated as a function of the cost of providing the IT service.

In addition to the fixed and variable costs associated with providing the IT service, a quality of the service cost can also be associated with one or more IT services. In this context, quality of the service can include both the availability of the service and the response time associated with utilizing the service. For example, a first level of availability of service, such as network access, is offered from 9 a.m. to 5 p.m. on Monday through Friday, a second level of quality of service is offered by from 9:00 a.m. to 10:00 p.m. on Monday through Friday, and a third level of quality of service is offered 24 hours a day, seven days a week. Similarly, a first level of quality of response time might require the system to process a request within 30 seconds, a second level might require the system to process a request within 15 seconds, and a third level of response time might require the system to process a request within 5 seconds. As would be readily understood, any number of quality levels or quality criteria is within the scope of the present invention.

With reference again to FIG. 2, in addition to the IT cost associated with providing the service, additional costs can be associated with providing specific qualities of the service. With reference to the above example, the cost associated with providing the third level of availability will be greater than the cost of providing first level of availability. These costs include additional equipment, software, facilities, and personnel to support a 24 hour, 7 day availability. Similarly, the different levels of response time could also include additional costs in equipment, software, facilities and personnel. Accordingly, by monitoring the relative quality of service provided to the user/computer, a user transaction cost can also be a function of the cost of providing the quality of service.

The present invention facilitates the tracking of various user/computer transactions and the correlation of one or more IT services to individual transactions. Additionally, the present invention facilitates the measurement of the cost of providing one or more of the identified IT services utilized to execute the transaction, which can include the cost of different levels of quality of service. By tracking the user/computer transaction and measuring the IT cost of the services utilized to execute the transaction, the present invention further facilitates the calculation of a transaction cost as a function of the actual cost incurred to execute the transaction.

Figure 4:
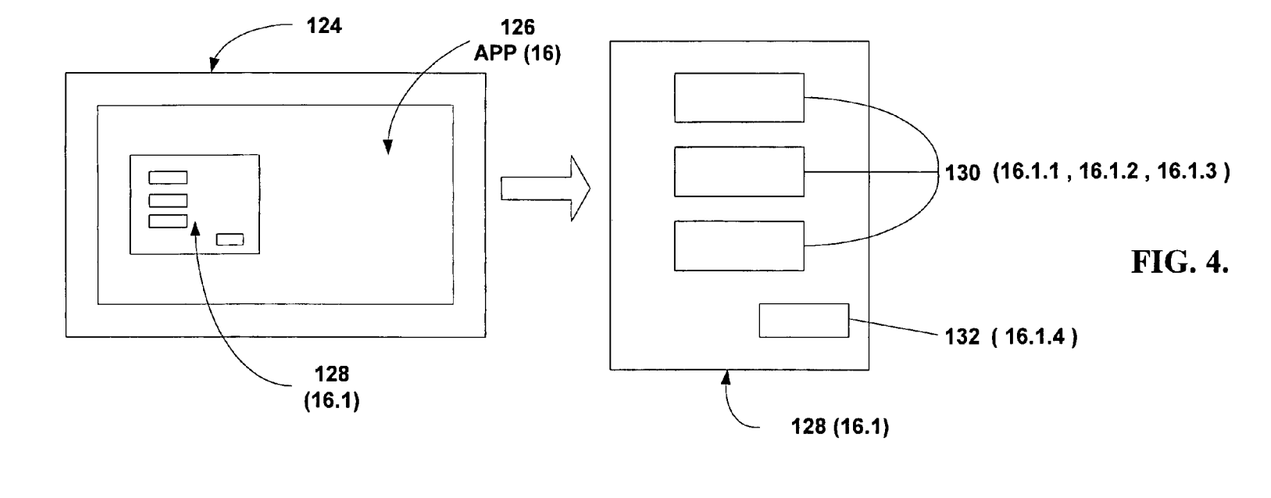
FIG. 4 is a block diagram illustrative of a user/computer transaction tracking method in accordance with the present invention.

FIG. 4 is a block diagram illustrative of a user/computer transaction tracking method in accordance with the present invention. To compute a user/computer transaction cost, the user/computer transaction should be identified. Additionally, if an actual user is monitored, the user can be identified to a particular computer, such as by a log in or other user identifier/password or by direct association within the operating system e.g., through Active Directory (AD), or another component of the Operating system. With reference to the previous example of utilizing a centralized database on the computer system, a user may be presented with a graphical desktop 124 presenting a database application window 126. Within the application window 126, the user may be presented with one or more other windows, such as a query window 128. Furthermore, the query window 128 may present the user with a variety of additional options, such as data fields 130 and an execution button 132.

Figure 5:
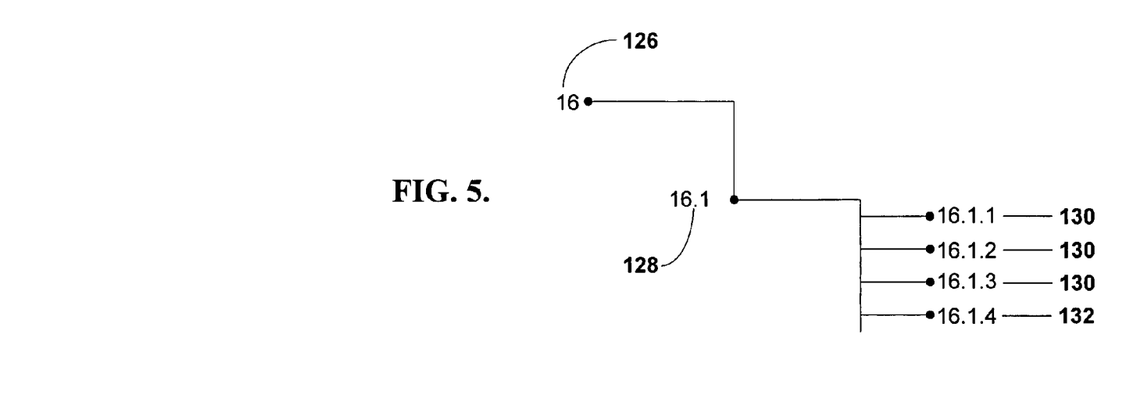
FIG. 5 is a tree diagram illustrative of the components of the user/computer transaction request of FIG. 4.

Preferably, the present invention is implemented in a graphical operating environment that tracks the various components of application programs. One such operating environment is Microsoft Corporation's Windows® brand operating system. In such a system, the application program 126 is given a transaction open handle, such as in this example "16". The query window 128, for example, would be identified by the base handle and would also include an additional identifier, such as "16.1". Similarly, each separate portion of the query window 128 would include the above-two handles and would include an additional handle. FIG. 5 is a tree diagram illustrative of the various handles of the user/computer application program. Thus, if the user enters data in one of the data fields 130, the handle of the transaction "16.1.1" would be associated with the data. Likewise, if the user indicates a search to be done by selecting the button 132, the handle "16.1.4" would be associated with the action. As would be readily understood, alternative methods of tracking would be considered within the scope of the present invention.

By breaking down an application program into each separate action/component and associating an identifiable handle with each part, the user/computer transaction can be monitored. The monitoring would include the ability to measure the response time for a requested service, the ability to measure the availability of the service, and the ability to identify which services were touched upon the user transaction request. For example, in the above-mentioned graphical operating environment, the open handles of the applications can be monitored as transaction pairs in the session layer of the OSI layer of the operating environment. Accordingly, by monitoring the beginning and end of the transaction, the transaction can be monitored. As would be readily understood, alternative transaction measurement tools, such as assigning each application a unique identifier, could be used in conjunction with or in replacement of the open handle monitoring method.

Once the services utilized by a user/computer transaction have been identified, the costs associated with the one or more IT services utilized to execute the user/computer transaction are calculated. Preferably, the cost of the IT service, in terms of providing the service and its different levels of quality, can be measured with a high degree of accuracy, reflecting the actual IT costs associated with the analysis. Preferably, each component, or sub-component, within the computer network includes fixed and variable costs. As would be generally understood, the granularity of calculating the transaction cost is dependent on the amount of data monitored in tracking the IT cost. Accordingly, the omission of one or more IT service costs from the calculation does not eliminate the functionality of present invention.

Preferably, fixed costs can be calculated utilizing an estimated number of users over a period of time, or may be retroactively calculated based on actual usage monitored over the same period of time. One example method of calculating the fixed cost of software includes dividing the depreciated original cost of the software license over a period of time, such as a year, by an estimated number of users over the period of time. The result relates the fixed software cost in terms of single user cost over the entire time period. Another approach to calculating fixed cost includes dividing the depreciated cost of the equipment over a period of time by an estimated amount of time the equipment can be utilized within that time period. The result relates the fixed equipment cost in terms of user cost per time of use. In another example of calculating fixed costs, a facility fixed cost can be calculated in terms of the rent and utilities of the facility divided by the number of users, either estimated or actual, utilizing the equipment and/or personnel housed in the facility. As would be generally understood, alternative methods of calculating the fixed cost of the IT services are considered within the scope of the present invention.

Additionally, variable costs are preferably calculated on an estimated amount of time consumed by the IT personnel (based on assigned responsibility). Alternatively, the variable cost may be retroactively calculated based on actual personnel time accounted for. For example, and with reference to FIGS. 2 and 3, the IT department may require a database specialist to support the database 116, an operating system specialist to support the operating system 120, a hardware specialist to support the server hardware 122 and a staff person to monitor and ensure that various service level agreements have not been violated for the database 114. Use of the database component of the computer system would incur the variable cost of a proportion of each of the technician's salaries. Thus, if a specific component in the computer system requires additional staff support, or includes different equipment to provide higher quality performance, the costs associated with that particular component will be increased.

To complete the transaction cost analysis, the user/computer transaction monitored with the open handle is associated with the actual cost of providing the IT services, including the availability and response time costs, to execute the transaction. With reference to FIG. 2, after the user/computer handle is identified as touching the various components of the computer system, an actual cost associated with utilizing each component, either on a per use basis or a time use basis, is attributed to the transaction. Accordingly, the transaction cost is calculated by summing the IT service costs of the IT services utilized in the execution of the transaction. For example, with reference to FIG. 2, if the IT service cost for each of the six components touched in the transaction is $2.50, $3.50, $4.00, $10.00, $0.50, and $2.50, respectively, the overall transaction cost for the database search would be $23.00.

Figure 6:
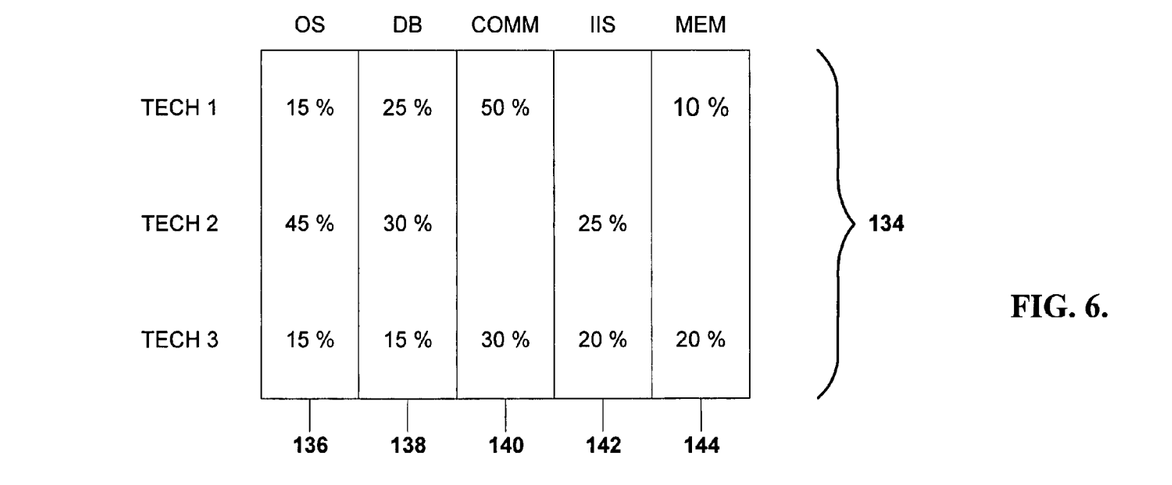
FIG. 6 is a block diagram of a fixed category service breakdown illustrating the correlation of an IT personnel cost to the categories in accordance with the present invention.

In an alternative embodiment, the calculation of an overall transaction cost is accomplished via fixed category general breakdowns, which correlate the IT budget to the delivered service. In this embodiment, a number of IT service sub-components common to many of the IT services are selected such that each IT service can be characterized by one or more of the sub-components. FIG. 6 is a block diagram illustrative of a fixed category service breakdown, referenced generally by the numeral 134. In this example, the fixed category sub-components include an operating system category 136, a database category 138, a network communication category 140, an Internet information category 142, and a general management category 144. Under this embodiment, each IT service can be defined as using one or more of these categories. Additionally, the overall IT budget can be apportioned according to which of the categories it supports.

To correlate the IT budget with the fixed category breakdown, the overall equipment, software, personnel and facility costs are apportioned according to the category. For example, an IT technician (Tech 1) making $100,000 spends 15% of his or her time on operating system support, 25% of his or her time on database support, 50% of his or her time on network communication and 10% of his or her time on general management. Accordingly, $15,000 would be attributed to the operating system category 136 cost, $25,000 would be attributed to the database category 138 cost, $50,000 would be attributed to the network communication category 140 cost and $10,000 would be attributed to the general management support category 144 cost. Preferably, the apportionment process is repeated for all the IT costs, e.g. all equipment, software, personnel (such as Tech 2 and Tech 3) and facilities, such that the entire IT budget is apportioned into the five fixed categories. As would be readily understood, alternative categorization methods would be considered within the scope of the present invention.

Figure 7:
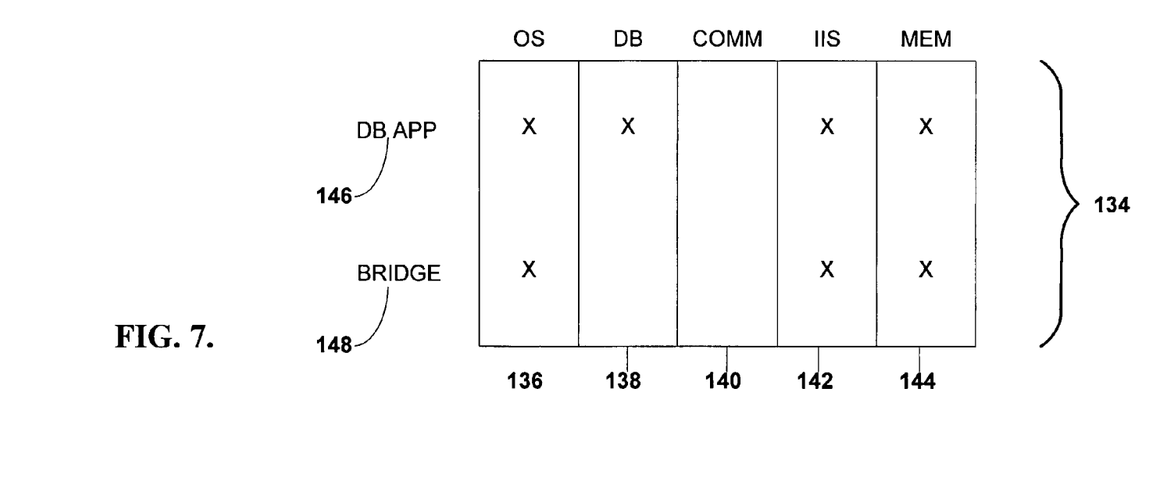
FIG. 7 is a block diagram of the fixed category service breakdown of FIG. 6 further illustrating the correlation of an IT service to the categories in accordance with the present invention.

Having associated an overall cost per category for the entire IT budget, the each computer system component is organized according the fixed category breakdown by designating whether the component utilizes each of the fixed categories. Each IT component is first identified. FIG. 7 is block diagram illustrative of fixed category breakdown as applied to individual IT services. For example, a database application, referenced generally by reference numeral 146, may be defined having an operating system category 136 component, a database category 138 component, an Internet information category 142 component, and a general management category 144 component. In comparison, the bridge of FIG. 2 may be defined as having an operating system category 136 component, an information category 142 component, and a general management component 144.

Preferably, the total cost assigned to the category, as calculated in FIG. 6, is divided by the total number of IT services according to each category, as calculated in FIG. 7. The result translates into a total cost per component in each category. For example, if the total cost assigned to the operating system category 136 is $100,000 and there are 100 components that utilize this category, the total cost per component in the operating system is $1000.

To calculate a transaction cost, a table is constructed listing each IT service and the number of users that are estimated, or known, to use that service. Accordingly, the cost of the service includes the total cost per component, as calculated in accordance with the above-mentioned method, divided by the total number users, either estimated or calculated. With reference to the above example, if 1000 users utilize the component every year, the cost per user would then be $1.00 per year. As would be readily understood, alternative or modified versions of this embodiment are considered within the scope of the present invention.

Figure 8:
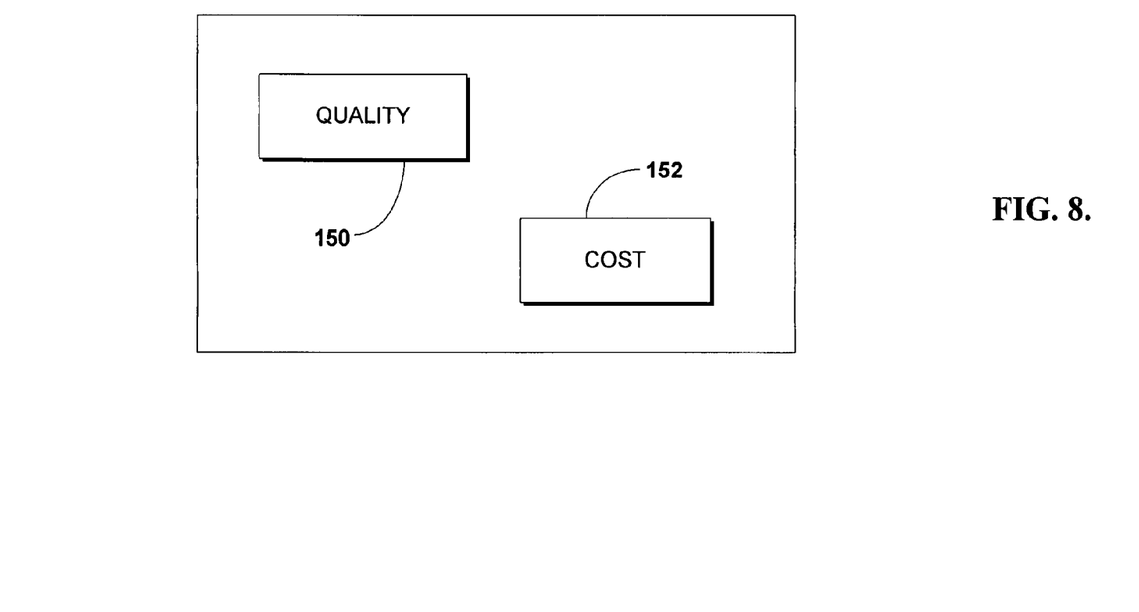
FIG. 8 is a block diagram illustrative of a transaction cost data structure in accordance with the present invention.

In another application of the present invention, FIG. 8 is a block diagram illustrative a data structure utilized to transmit the transaction cost information in accordance with the present invention. In this application, the cost information often needs to be transmitted to user/computer and/or to a service cost accounting module. As such, the data structure can include a quality cost component 150 and a providing cost component 152. In a first embodiment, each component of a computer system may attach their individual cost component data structures to the transaction request allowing a sum total to be calculated. Alternatively, monitoring software within the system may summarize the total cost for all the components in the computer system and attach the single piece of information to a single data structure.

The methods and structures of the present invention may be incorporated in a variety of software applications and operating environments. By calculating a user/computer transaction cost, the cost of providing several IT services, such as the specialized IT services, may be attributed to those users/computers that utilize those services. Additionally, in terms of managing an IT department, many of the more expensive, limited use IT services may be eliminated or modified if a calculated user/computer transaction cost becomes too high. From a business perspective, the user/computer transaction cost may be passed directly on to the client utilizing the service, or may be used to regulate and better understand the cost of various IT department services.

In an alternative application of the present invention, the present invention facilitates the marketing of providing a computer system as service. In this approach, a user/computer is given access to one or more services on the computer network, which are priced as providing the service. Accordingly, the provider's cost (in terms of equipment, software, facilities, and personnel) to provide the user access can be directly passed along to the user/computer transaction. From the user's perspective, however, access to the latest versions of a software application only requires access to the provider and a service charge.

While many program languages could be used to create the object windows and functions of the present invention, the present invention may preferably be coded by an object oriented language such as Microsoft Corporation's "VISUAL C++®" OR "VISUAL BASIC®" programming languages.

Alternative embodiments of the present invention will become apparent to those skilled in3 the art to which it pertains upon review of the specification, including the drawing figures. Accordingly, the scope of the present invention is defined by the appended claims rather than the foregoing description.

We claim:

1. A method in a computer system for assigning a monetary cost to a computer transaction, the method comprising:

identifying two or more information technology services utilized to execute the computer transaction, wherein the information technology services include telephone services, network access services, maintenance services, software services, support services, and hardware services;

determining a monetary computer transaction cost associated with the two or more services utilized to execute the transaction, wherein determining the monetary computer transaction cost comprises:

(1) identifying each resource utilized to provide the two or more services, wherein a portion of an original cost or a depreciated cost of each identified resource is assigned to the computer transaction, (2) determining a quality cost that represents a cost for a level of quality of each of the two or more services utilized to execute the transaction, wherein the quality cost for each of the two or more services comprises an availability cost that represents the cost for the availability of each of the two or more services and a response time cost that represents the cost of the response time for each of the two or more services, and (3) combining the portion of the original cost or depreciated cost and the quality cost to define the monetary computer transaction cost for each identified resource utilized to provide the two or more services; and summing the monetary computer transaction cost for each identified resource to determine the monetary cost for the computer transaction in order to pass the monetary cost for the computer transaction to a user executing the computer transaction.

2. The method as recited in claim 1, wherein equipment is a utilized resource and the monetary computer transaction cost includes an equipment cost and wherein the determining step includes calculating the equipment cost as a percentage of an overall equipment cost for equipment utilized to execute the transaction.

3. The method as recited in claim 2, wherein software is a utilized resource and the monetary computer transaction cost includes a software cost and wherein the determining step includes calculating the software cost as a percentage of an overall software cost for the equipment utilized to execute the transaction.

4. The method as recited in claim 3, wherein personnel is a utilized resource and the monetary computer transaction cost includes a personnel cost and wherein the determining step includes calculating the personnel cost as a percentage of an overall personnel cost for maintaining the software and the equipment utilized to execute the transaction.

5. The method as recited in claim 4, wherein a facility is a utilized resource and the monetary computer transaction cost includes a facility cost and wherein the determining step includes calculating the facility cost as a percentage of an overall facility cost for supporting and housing the equipment and personnel utilized to execute the transaction.

6. The method as recited in claim 1, wherein the availability cost includes an equipment cost and wherein the step of determining a cost for the availability includes calculating the equipment cost as a percentage of an overall equipment cost for equipment utilized to provide the availability of the one or more services.

7. The method as recited in claim 6, wherein the availability cost includes a software cost and wherein the step of determining a cost for the availability includes calculating the software cost as a percentage of an overall software cost for the equipment utilized to provide the availability of the one or more services.

8. The method as recited in claim 7, wherein the availability cost includes a personnel cost and wherein the step of determining a cost for the availability includes calculating the personnel cost as a percentage of an overall personnel cost for maintaining the software and the equipment utilized to provide the availability of the one or more services.

9. The method as recited in claim 8, wherein the availability cost includes a facility cost and wherein the step of determining a cost for the availability includes calculating the facility cost as a percentage of an overall facility cost for supporting and housing the equipment and personnel utilized to provide the availability of the one or more services.

10. The method as recited in claim 1, wherein the response time cost includes an equipment cost and wherein the step of determining a cost for the response time includes calculating the equipment cost as a percentage of an overall equipment cost for equipment utilized to provide the response time of the one or more services.

11. The method as recited in claim 10, wherein the response time cost includes a software cost and wherein the step of determining a cost for the response time includes calculating the software cost as a percentage of an overall software cost for the equipment utilized to provide the response time of the one or more services.

12. The method as recited in claim 11, wherein the response time cost includes a personnel cost and wherein the step of determining a cost for the response time includes calculating the personnel cost as a percentage of an overall personnel cost of maintaining the software and the equipment utilized to provide the response time of the one or more services.

13. The method as recited in claim 12, wherein the response time cost includes a facility cost and wherein the step of determining a cost for the response time includes calculating the facility cost as a percentage of an overall facility cost for supporting and housing the equipment and personnel utilized to provide the response time of the one or more services.

14. The method of claim 1, further comprising:

identifying a fixed cost resource and attributing a portion of a depreciated cost, an original cost, or an usage cost for the fixed cost resource to the computer transaction, and identifying variable cost resources and determining a portion of a personnel cost for the variable cost resources required to conduct the transaction; and summing the portion of the depreciated cost, the original cost, or the usage cost for the fixed cost resource and the portion of the personnel cost for the variable cost resource to determine the monetary cost for the computer transaction.

15. One or more computer-readable medium having computer-executable instructions for assigning a monetary cost to a computer transaction, the computer-executable instructions perform a method comprising:

identifying two or more information technology services utilized to execute the computer transaction, wherein the information technology services include telephone services, network access services, maintenance services, software services, support services, and hardware services;

determining a monetary computer transaction cost associated with the two or more services utilized to execute the transaction, wherein determining the monetary computer transaction cost comprises:
(1) identifying each resource utilized to provide the two or more services, wherein a portion of an original cost or a depreciated cost of each identified resource is assigned to the computer transaction,
(2) determining a quality cost that represents a cost for a level of quality of each of the two or more services utilized to execute the transaction, wherein the quality cost for each of the two or more services comprises an availability cost that represents the cost for the availability of each of the two or more services and a response time cost that represents the cost of the response time for each of the two or more services, and
(3) combining the portion of the original cost or depreciated cost and the quality cost to define the monetary computer transaction cost for each identified resource utilized to provide the two or more services; and summing the monetary computer transaction cost for each identified resource to determine the monetary cost for the computer transaction in order to pass the monetary cost for the computer transaction to a user executing the computer transaction.

16. A computer system having a processor, an operating system, a memory, the processor being configured to carry out the steps comprising:

identifying two or more information technology services utilized to execute the computer transaction, wherein the information technology services include telephone services, network access services, maintenance services, software services, support services, and hardware services:

determining a monetary computer transaction cost associated with the two or more services utilized to execute the transaction, wherein determining the monetary computer transaction cost comprises:
(1) identifying each resource utilized to provide the two or more services, wherein a portion of an original cost or a depreciated cost of each identified resource is assigned to the computer transaction,
(2) determining a quality cost that represents a cost for a level of quality of each of the two or more services utilized to execute the transaction, wherein the quality cost for each of the two or more services comprises an availability cost that represents the cost for the availability of each of the two or more services and a response time cost that represents the cost of the response time for each of the two or more services, and
(3) combining the portion of the original cost or depreciated cost and the quality cost to define the monetary computer transaction cost for each identified resource utilized to provide the two or more services; and summing the monetary computer transaction cost for each identified resource to determine the monetary cost for the computer transaction in order to pass the monetary cost for the computer transaction to a user executing the computer transaction.

17. A computer system having a processor an operating system, a memory, the processor being configured to carry out the steps comprising:

identifying two or more services necessary for conducting the computer transaction, wherein the two or more services include telephone services, network access services, maintenance services, software services, support services, and hardware services, and identifying the two or more services comprise:

assigning identifiers to applications associated with the two or more services and to components of the applications that are triggered by the computer transaction; and monitoring each identified application and each identified component to calculate a response time for the two or more services accessed by the computer transaction and to calculate the availability of the two or more services accessed by the computer transaction;

identifying resources utilized in providing the two or more services; and determining a monetary cost to a provider for each resource and determining the monetary cost for the computer transaction, wherein the monetary cost for the computer transaction is a function of a depreciated cost or an original cost for each utilized resource and a quality cost of each of the two or more services, wherein the quality cost comprises an availability cost based on the calculated availability time of the two or more services and a response cost based on the calculated response time of the two or more services.

18. The system of claim 17, wherein the resources comprise utilized personnel, software, hardware, facilities and equipment costs that are percentages of an overall personnel, software, hardware, facilities and equipment costs.

* * * * *

UNITED STATES PATENT AND TRADEMARK OFFICE
CERTIFICATE OF CORRECTION

| | | |
|---|---|---|
| PATENT NO. | : 7,353,212 B1 | Page 1 of 1 |
| APPLICATION NO. | : 09/576686 | |
| DATED | : April 1, 2008 | |
| INVENTOR(S) | : Paul B. Darcy et al. | |

It is certified that error appears in the above-identified patent and that said Letters Patent is hereby corrected as shown below:

In column 16, line 13, in Claim 17, delete "processor" and insert -- processor, --, therefor.

Signed and Sealed this
Twenty-second Day of February, 2011

David J. Kappos
*Director of the United States Patent and Trademark Office*